United States Patent
Calvin et al.

(10) Patent No.: US 10,212,209 B2
(45) Date of Patent: Feb. 19, 2019

(54) TECHNIQUES FOR METADATA-DRIVEN DYNAMIC CONTENT SERVING

(71) Applicant: salesforce.com, inc., San Francisco, CA (US)

(72) Inventors: Philip N. Calvin, San Francisco, CA (US); Brian Zotter, Danville, CA (US); Eric Dorgelo, Vancouver (CA)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 15/339,688

(22) Filed: Oct. 31, 2016

(65) Prior Publication Data

US 2017/0048301 A1  Feb. 16, 2017

Related U.S. Application Data

(63) Continuation of application No. 15/041,425, filed on Feb. 11, 2016, now Pat. No. 9,525,720, which is a
(Continued)

(51) Int. Cl.
*G06F 17/30* (2006.01)
*H04L 29/08* (2006.01)
*G06F 15/16* (2006.01)

(52) U.S. Cl.
CPC .......... *H04L 67/02* (2013.01); *G06F 17/3089* (2013.01); *H04L 67/10* (2013.01);
(Continued)

(58) Field of Classification Search
CPC ....... H04L 67/02; H04L 67/025; H04L 67/10; H04L 67/28; H04L 67/2838; G06F 17/3089
(Continued)

(56) References Cited

U.S. PATENT DOCUMENTS 5,388,214 A  2/1995  Leiserson et al.
5,577,188 A  11/1996  Zhu
(Continued)

FOREIGN PATENT DOCUMENTS

JP  2002032299 A  1/2002
JP  2002049585 A  2/2002
(Continued)

OTHER PUBLICATIONS

Final Office Action for U.S. Appl. No. 13/310,525 dated Jan. 5, 2018, 29 pages.
(Continued)

*Primary Examiner* — El Hadji M Sall
(74) *Attorney, Agent, or Firm* — Jaffery, Watson, Mendonsa & Hamilton, LLP

(57) ABSTRACT

Techniques for metadata-driven dynamic content serving. Metadata content is stored as a source instance. The metadata content is utilized to provide dynamically-constructed pages. The metadata content is published to runtime pods communicatively coupled to receive the metadata content. The source instance includes a metadata definition repository and is a primary source of dynamic data for serving pages in the runtime pods. The runtime pods are groups of multiple servers that act as a single entity to dynamically generate metadata-driven content in response to requests received from client devices. A request for content is received with a selected one of the runtime pods for a specific site. The specific site is mapped to a user identified by a user identifier. The user identifier is utilized to retrieve site metadata from a site metadata server. Content is provided in response to the request with the selected runtime pod utilizing the metadata content.

18 Claims, 7 Drawing Sheets

Related U.S. Application Data continuation of application No. 14/592,804, filed on Jan. 8, 2015, now Pat. No. 9,276,995, which is a continuation of application No. 13/248,459, filed on Sep. 29, 2011, now Pat. No. 8,935,360.

(60) Provisional application No. 61/419,611, filed on Dec. 3, 2010.

(52) U.S. Cl.
CPC ............ *H04L 67/28* (2013.01); *H04L 67/025* (2013.01); *H04L 67/2838* (2013.01)

(58) Field of Classification Search
USPC ........................................ 709/217, 200, 219
See application file for complete search history.

(56) References Cited

U.S. PATENT DOCUMENTS

| | | | |
|---|---|---|---|
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,815,703 A | 9/1998 | Copeland et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,031,987 A | 2/2000 | Damani et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,249,291 B1 | 6/2001 | Popp et al. | |
| 6,266,669 B1 | 7/2001 | Brodersen et al. | |
| 6,272,537 B1 | 8/2001 | Kekic et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| 6,341,262 B1 | 1/2002 | Damani et al. | |
| D454,139 S | 3/2002 | Feldcamp | |
| 6,367,077 B1 | 4/2002 | Brodersen et al. | |
| 6,393,386 B1 | 5/2002 | Zager et al. | |
| 6,393,605 B1 | 5/2002 | Loomans | |
| 6,405,220 B1 | 6/2002 | Brodersen et al. | |
| 6,429,880 B2 | 8/2002 | Marcos et al. | |
| 6,434,550 B1 | 8/2002 | Warner et al. | |
| 6,446,089 B1 | 9/2002 | Brodersen et al. | |
| 6,505,212 B2 | 1/2003 | Nakano et al. | |
| 6,535,909 B1 | 3/2003 | Rust | |
| 6,546,397 B1 | 4/2003 | Rempell | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,560,639 B1 | 5/2003 | Dan et al. | |
| 6,574,635 B2 | 6/2003 | Stauber et al. | |
| 6,577,726 B1 | 6/2003 | Huang et al. | |
| 6,581,063 B1 | 6/2003 | Kirkman | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,636,886 B1 | 10/2003 | Katiyar et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,732,332 B2 | 5/2004 | Borysewicz et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,769,032 B1 | 7/2004 | Katiyar et al. | |
| 6,782,383 B2 | 8/2004 | Subramaniam et al. | |
| 6,792,454 B2 | 9/2004 | Nakano et al. | |
| 6,792,475 B1 | 9/2004 | Arcuri et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,889,260 B1 | 5/2005 | Hughes | |
| 6,938,050 B2 | 8/2005 | Le et al. | |
| 6,957,218 B1 | 10/2005 | Wyatt | |
| 6,961,750 B1 | 11/2005 | Burd et al. | |
| 6,968,372 B1 * | 11/2005 | Thompson .......... H04L 67/1095 709/223 |
| 6,985,927 B2 | 1/2006 | O'Brien et al. | |
| 7,003,528 B2 | 2/2006 | Dan et al. | |
| 7,003,777 B2 | 2/2006 | Hines | |
| 7,020,722 B2 | 3/2006 | Sivier et al. | |
| 7,032,225 B2 | 4/2006 | Wang et al. | |
| 7,092,995 B2 | 8/2006 | Kaler et al. | |
| 7,171,664 B2 | 1/2007 | Wang et al. | |
| 7,246,054 B2 | 7/2007 | Szymanski et al. | |
| 7,287,215 B2 | 10/2007 | Arcuri et al. | |
| 7,289,976 B2 | 10/2007 | Kihneman et al. | |
| 7,330,722 B1 | 2/2008 | Kirtley et al. | |
| 7,340,411 B2 | 3/2008 | Cook | |
| 7,441,008 B2 | 10/2008 | Johnson | |
| 7,451,393 B1 | 11/2008 | Herbison et al. | |
| 7,523,214 B2 * | 4/2009 | Kikkawa ............ H04N 21/4627 709/230 |
| 7,620,655 B2 | 11/2009 | Larsson et al. | |
| 7,627,649 B2 | 12/2009 | Saras | |
| 7,689,593 B2 * | 3/2010 | Becker ................ G06F 17/3089 707/999.107 |
| 7,752,258 B2 | 7/2010 | Lewin et al. | |
| 7,930,318 B2 * | 4/2011 | Becker ................ G06F 17/3089 707/795 |
| 8,190,679 B1 | 5/2012 | Gay et al. | |
| 8,306,979 B2 | 11/2012 | Mao et al. | |
| 8,364,540 B2 | 1/2013 | Soroca et al. | |
| 8,397,223 B2 | 3/2013 | Chiang | |
| 8,402,427 B2 | 3/2013 | Chiang | |
| 8,442,996 B2 * | 5/2013 | Maim ................ G06F 17/2229 707/791 |
| 8,607,139 B2 | 12/2013 | Alexander | |
| 8,615,583 B2 * | 12/2013 | Plamondon ......... H04L 67/2847 709/225 |
| 8,671,021 B2 | 3/2014 | Maharajh et al. | |
| 8,819,187 B1 | 8/2014 | Hofmann | |
| 8,825,830 B2 | 9/2014 | Newton et al. | |
| 8,855,469 B2 | 10/2014 | Maharajh et al. | |
| 8,924,412 B2 * | 12/2014 | Rhoads ............... G06F 17/3002 707/694 |
| 8,994,815 B2 | 3/2015 | Mito et al. | |
| 9,064,010 B2 | 6/2015 | Maharajh et al. | |
| 9,124,650 B2 | 9/2015 | Maharajh et al. | |
| 9,223,892 B2 | 12/2015 | Calvin et al. | |
| 9,276,995 B2 | 3/2016 | Calvin et al. | |
| 9,648,125 B2 * | 5/2017 | Flack ............... H04N 21/23106 |
| 2001/0037490 A1 | 11/2001 | Chiang | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |

(56) References Cited

U.S. PATENT DOCUMENTS

| | | |
|---|---|---|
| 2002/0035577 A1 | 3/2002 | Brodersen et al. |
| 2002/0042264 A1 | 4/2002 | Kim |
| 2002/0042843 A1 | 4/2002 | Diec |
| 2002/0046245 A1 | 4/2002 | Hillar et al. |
| 2002/0049697 A1 | 4/2002 | Nakano et al. |
| 2002/0059558 A1 | 5/2002 | Hines |
| 2002/0072951 A1 | 6/2002 | Lee et al. |
| 2002/0082892 A1 | 6/2002 | Raffel et al. |
| 2002/0095423 A1 | 7/2002 | Dessloch et al. |
| 2002/0129352 A1 | 9/2002 | Brodersen et al. |
| 2002/0133561 A1 | 9/2002 | O'Brien et al. |
| 2002/0133637 A1 | 9/2002 | Popp et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0014442 A1 | 1/2003 | Shiigi et al. |
| 2003/0018705 A1 | 1/2003 | Chen et al. |
| 2003/0018830 A1 | 1/2003 | Chen et al. |
| 2003/0028517 A1 | 2/2003 | Nakano et al. |
| 2003/0037119 A1 | 2/2003 | Austin |
| 2003/0050929 A1 | 3/2003 | Bookman et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0093569 A1 | 5/2003 | Sivier et al. |
| 2003/0097664 A1 | 5/2003 | Meyers et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0182308 A1 | 9/2003 | Ernst et al. |
| 2003/0187821 A1 | 10/2003 | Cotton et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0204810 A1 | 10/2003 | Dam et al. |
| 2003/0206192 A1 | 11/2003 | Chen et al. |
| 2003/0217117 A1 | 11/2003 | Dan et al. |
| 2003/0225730 A1 | 12/2003 | Warner et al. |
| 2003/0226132 A1 | 12/2003 | Tondreau et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0024578 A1 | 2/2004 | Szymanski et al. |
| 2004/0027388 A1 | 2/2004 | Berg et al. |
| 2004/0111398 A1 | 6/2004 | England et al. |
| 2004/0111400 A1 | 6/2004 | Chevalier |
| 2004/0111728 A1* | 6/2004 | Schwalm ............... H04L 29/06 719/316 |
| 2004/0117795 A1 | 6/2004 | Wang et al. |
| 2004/0123238 A1 | 6/2004 | Hefetz et al. |
| 2004/0123293 A1 | 6/2004 | Johnson |
| 2004/0128001 A1 | 7/2004 | Levin et al. |
| 2004/0167989 A1 | 8/2004 | Kline et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0215604 A1 | 10/2004 | Ivanov |
| 2004/0215719 A1 | 10/2004 | Altshuler |
| 2004/0230983 A1 | 11/2004 | Shi et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0004903 A1 | 1/2005 | Tsuda |
| 2005/0005089 A1 | 1/2005 | Eckhart et al. |
| 2005/0015357 A1 | 1/2005 | Shahidi |
| 2005/0028081 A1 | 2/2005 | Arcuri et al. |
| 2005/0050555 A1 | 3/2005 | Exley et al. |
| 2005/0060687 A1 | 3/2005 | Ghazaleh et al. |
| 2005/0081142 A1 | 4/2005 | Popp et al. |
| 2005/0091026 A1 | 4/2005 | Hodgson et al. |
| 2005/0091098 A1 | 4/2005 | Brodersen et al. |
| 2005/0132272 A1 | 6/2005 | Bodin et al. |
| 2005/0138086 A1 | 6/2005 | Pecht-Seibert |
| 2005/0223022 A1 | 10/2005 | Weissman et al. |
| 2005/0235256 A1 | 10/2005 | Freydl |
| 2005/0246627 A1 | 11/2005 | Sayed |
| 2006/0206599 A1 | 9/2006 | Milligan et al. |
| 2006/0212531 A1 | 9/2006 | Kikkawa et al. |
| 2006/0218180 A1 | 9/2006 | Bodlaender et al. |
| 2006/0294500 A1 | 12/2006 | Chiang |
| 2007/0061408 A1 | 3/2007 | Saras |
| 2007/0129928 A1 | 6/2007 | Lin et al. |
| 2007/0162969 A1* | 7/2007 | Becker ............... G06F 17/3089 726/16 |
| 2007/0204013 A1 | 8/2007 | Castrucci |
| 2007/0214113 A1 | 9/2007 | Lei et al. |
| 2008/0010381 A1* | 1/2008 | Barraclough ..... G06F 17/30867 709/228 |
| 2008/0052668 A1 | 2/2008 | Craig et al. |
| 2008/0140759 A1 | 6/2008 | Conner et al. |
| 2008/0140760 A1 | 6/2008 | Conner et al. |
| 2008/0140857 A1 | 6/2008 | Conner et al. |
| 2008/0172608 A1 | 7/2008 | Patrawala et al. |
| 2008/0207182 A1 | 8/2008 | Maharajh et al. |
| 2008/0222397 A1 | 9/2008 | Wilkerson et al. |
| 2008/0288451 A1 | 11/2008 | Jiang et al. |
| 2008/0288608 A1 | 11/2008 | Johnson |
| 2008/0290987 A1 | 11/2008 | Li |
| 2009/0037460 A1 | 2/2009 | Medicke et al. |
| 2009/0106356 A1* | 4/2009 | Brase ................. G06F 17/3002 709/203 |
| 2009/0150518 A1* | 6/2009 | Lewin ................. H04L 67/2842 709/219 |
| 2009/0177744 A1 | 7/2009 | Marlow et al. |
| 2009/0248793 A1 | 10/2009 | Jacobsson et al. |
| 2010/0017368 A1 | 1/2010 | Mao et al. |
| 2010/0095197 A1* | 4/2010 | Klevenz ............. G06F 17/2247 715/234 |
| 2010/0185614 A1 | 7/2010 | O'Brien et al. |
| 2010/0250599 A1 | 9/2010 | Schmidt et al. |
| 2010/0325583 A1 | 12/2010 | Aarni et al. |
| 2011/0071901 A1 | 3/2011 | Fries |
| 2011/0276664 A1 | 11/2011 | Prahlad et al. |
| 2012/0010995 A1 | 1/2012 | Skirpa et al. |
| 2012/0011167 A1* | 1/2012 | Schmidt ............. G06F 17/3087 707/802 |
| 2012/0174064 A1 | 7/2012 | Polly et al. |
| 2013/0097664 A1 | 4/2013 | Herz et al. |
| 2013/0136253 A1 | 5/2013 | Ben-Ami et al. |
| 2014/0089459 A1 | 3/2014 | Werr |
| 2014/0173054 A1 | 6/2014 | Varney et al. |
| 2014/0230076 A1* | 8/2014 | Micucci ............. G06F 17/30861 726/28 |
| 2015/0135300 A1 | 5/2015 | Ford |
| 2015/0163206 A1 | 6/2015 | McCarthy et al. |
| 2015/0310188 A1 | 10/2015 | Ford et al. |
| 2016/0224638 A1* | 8/2016 | Bestler ............. G06F 17/30548 |
| 2016/0255139 A1* | 9/2016 | Rathod ................. H04L 67/10 |

FOREIGN PATENT DOCUMENTS

| | | |
|---|---|---|
| WO | WO-2005062211 | 7/2005 |
| WO | WO-2007092373 | 8/2007 |

OTHER PUBLICATIONS

Stateless protocol, Wikipedia, available at https://en.wikipedia.org/wiki/Stateless_protocol (accessed Dec. 30, 2017).

(56) References Cited

OTHER PUBLICATIONS

Stateless, TechTarget, available at http://whatis.techtarget.com/definition/stateless (accessed Dec. 30, 2017).
Office Action for U.S. Appl. No. 13/310,525 dated Jun. 16, 2016, 30 pages.
Office Action for U.S. Appl. No. 14/954,879 dated May 6, 2016, 15 pages.
Office Action for U.S. Appl. No. 13/248,459 dated Mar. 7, 2013, 10 pages.
Office Action for U.S. Appl. No. 13/248,459 dated Apr. 18, 2014, 12 pages.
Final Office Action for U.S. Appl. No. 13/248,459 dated Sep. 30, 2013, 11 pages.
International Search Report and Written Opinion for PCT/CA2009/000569 dated Jul. 27, 2009, 10 pages.
International Preliminary Report on Patentability for PCT/CA2009/000569 dated Nov. 11, 2010, 8 pages.
Notice of Allowance for U.S. Appl. No. 13/248,459 dated Sep. 9, 2014, 10 pages.
Non-Final Office Action for U.S. Appl. No. 13/310,525 dated Oct. 10, 2014, 28 pages.
Non-Final Office Action for U.S. Appl. No. 13/248,472 dated Feb. 27, 2015, 8 pages.
Non-Final Office Action for U.S. Appl. No. 14/592,804 dated Mar. 27, 2015, 14 pages.
Non-Final Office. Action for U.S. Appl. No. 14/283,028 dated Mar. 18, 2015, 21 pages.
Final Office Action for U.S. Appl. No. 13/310,525 dated Apr. 22, 2015, 24 pages.
Notice of Allowance for U.S. Appl. No. 12/935,890, dated May 15, 2014, 2 pages.
Non-Final Office Action for U.S. Appl. No. 12/935,890, dated Jul. 9, 2013, 26 pages.
Non-Final Office Action for U.S. Appl. No. 12/935,890, dated Jan. 28, 2013, 16 pages.
Notice of Allowance for U.S. Appl. No. 14/283,028 dated Jul. 8, 2015, 16 pages.
Final Office Action for U.S. Appl. No. 14/592,804 dated Jul. 9, 2015, 13 pages.
Notice of Allowance for U.S. Appl. No. 13/248,472 dated Aug. 24, 2015, 14 pages.
Non-Final Office Action for U.S. Appl. No. 13/310,525 dated Aug. 31, 2015, 26 pages.
Notice of Allowance for U.S. Appl. No. 14/592,804 dated Oct. 14, 2015, 8 pages.
Examination Report for European Patent Application No. 09737586.9 dated Nov. 18, 2015, 4 pages.
Final Office Action for U.S. Appl. No. 13/310,525 dated Jan. 4, 2016, 31 pages.
Office Action for Canadian Patent Application No. 2,720,897 dated Jan. 18, 2013, 3 pages.
Office Action for U.S. Appl. No. 12/895,715 dated Oct. 12, 2012, 18 pages.
Notice of Allowance for U.S. Appl. No. 12/895,713 dated Jun. 25, 2013, 18 pages.
Office Action for Canadian Patent Application No. 2720897 dated Dec. 16, 2013, 3 pages.
Notice of Allowance for U.S. Appl. No. 12/935,890, dated Feb. 12, 2014, 15 pages.
Examination Report for European Patent Application No. 09737586.9 dated Nov. 14, 2013, 6 pages.
Atterer, et al. "Tracking the Interaction of Users with AJAX Applications for Usability Testing," Apr./May 2007, ACM, p. 1347-1350.
Chen, et al. "Function-Based Object Model Towards Website Adaptation," May 2001, ACM, p. 587-596.
Non-Final Office Action for U.S. Appl. No. 13/310,525 dated Jun. 15, 2017, 28 pages.
Summons to Attend Oral Proceedings for European Patent Application No. 09737586.9 dated Apr. 12, 2017, 7 pages.
Notice of Allowance for U.S. Appl. No. 14/928,004 dated Jul. 6, 2017, 16 pages.
Summons to Attend Oral Proceedings for European Patent Application No. 09737586.9 mailed Apr. 12, 2017, 7 pages.
"Responsive Layout Templates", <http://www.ibm.com/support/knowledgecenter/SSZLC2.sub.--7.0.0/com.ibm-.commerce.aurora-starterstore.doc/refs/rsmaurorasa.sub.--rwdtemplates.htm&-gt; 3 pgs.
Corrected Notice of Allowability for U.S. Appl. No. 14/928,004 dated Sep. 22, 2017, 2 pages.
Extended European Search Report for European Patent Application No. 09737586.9 dated Dec. 16, 2011, 5 pages.
Final Office Action for U.S. Appl. No. 13/310,525 dated Jan. 12, 2017, 32 pages.
Gaul, Patrick, et al., "Supporting Mobile Devices with Microsoft Content Management Server 2002", May 2003, 56 pgs.
Non-Final Office Action for U.S. Appl. No. 13/310,525 dated Jul. 11, 2018, 30 pages.
Non-Final Office Action for U.S. Appl. No. 15/041,425 dated Apr. 22, 2016, 9 pages.
Notice of Allowance for Canadian Patent Application No. 2,720,897 dated Sep. 12, 2014, 1 page.
Notice of Allowance for U.S. Appl. No. 14/928,004 dated Feb. 24, 2017, 18 pages.
Notice of Allowance for U.S. Appl. No. 14/954,879 dated Aug. 26, 2016, 7 pages.
Notice of Allowance for U.S. Appl. No. 14/954,879 dated Dec. 19, 2016, 8 pages.
Notice of Allowance for U.S. Appl. No. 15/041,425 dated Aug. 12, 2016, 8 pages.
Notice of Reasons for Rejection for Japanese Patent Application No. 2011-505333 dated Apr. 30, 2013, 6 pages.

\* cited by examiner

TECHNIQUES FOR METADATA-DRIVEN DYNAMIC CONTENT SERVING

CLAIM OF PRIORITY

This United States continuation patent application is related to, and claims priority to, U.S. patent application Ser. No. 15/041,425, entitled "TECHNIQUES FOR METADATA-DRIVEN DYNAMIC CONTENT SERVING," filed Feb. 11, 2016, which is a continuation of U.S. patent application Ser. No. 14/592,804, entitled "TECHNIQUES FOR METADATA-DRIVEN DYNAMIC CONTENT SERVING," filed Jan. 8, 2015 and issued as U.S. Pat. No. 9,276,995 on Mar. 1, 2016, which is a continuation of U.S. patent application Ser. No. 13/248,459, entitled "TECHNIQUES FOR METADATA-DRIVEN DYNAMIC CONTENT SERVING," filed Sep. 29, 2011 and issued as U.S. Pat. No. 8,935,360 on Jan. 13, 2015; which claims the benefit of U.S. Provisional Patent Application No. 61/419,611, entitled "A CONTENT MANAGEMENT SYSTEM FOR DEVELOPING AND INTERACTING WITH WEBSITES," filed Dec. 3, 2010, the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate to techniques for providing metadata-driven content. More particularly, embodiments relate to techniques for hosting content in a manner that supports use of multiple servers to provide metadata-driven dynamic content.

BACKGROUND

Servers that provide content in the form of pages to requesting devices generally cannot provide constant uptime availability. This may be the result of various conditions including routine maintenance operations, system upgrades, content changes, etc. This is a less than optimal situation for providing content.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

In various embodiments of architectures described herein, combinations of one or more servers are utilized to host metadata driven dynamic pages. These architectures may be referred to as "Runtime Pods" that may be configured to provide constant (100%) uptime availability. Embodiments of runtime pods utilize a collection of servers that may include, but are not limited to, reverse proxy servers, web application servers and/or database servers. In some embodiments, the servers operate as a single unit to host metadata driven dynamic pages. In one embodiment, these runtime pods are stateless.

In some embodiments, the runtime pod hosting is located and isolated away from a 'source instance' of the content. The source instance refers to a metadata definition repository and is a primary source of dynamic data for serving pages. In one embodiment, page metadata is created and maintained on the source instance. This allows the architecture to remain active when the source instance is down for any reason.

In one embodiment, a runtime pod may be utilized a version-aware application programming interface (API) to create, read, update and delete data from the source instance. The API is versioned so that the source instance and runtime pod(s) may be on different versions. If the source instance is down, the pages may still be available even if dynamic data from the source instance may not be show, or alternatively, a cached version of the data may be served.

Figure 1:
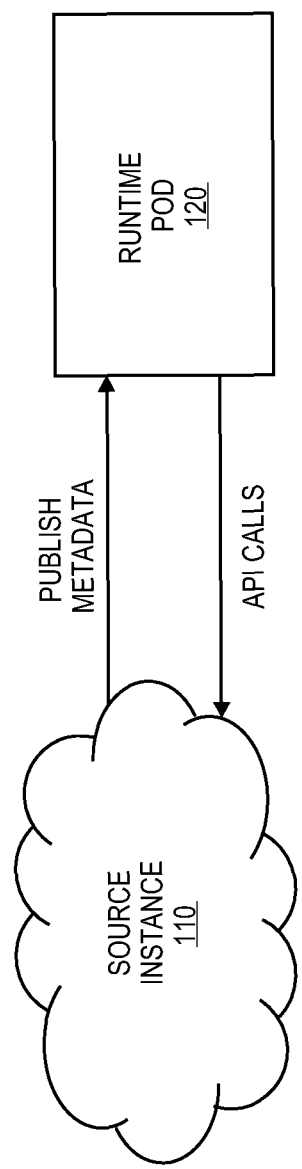
FIG. 1 is a conceptual diagram of a runtime pod that may interact with a source instance of data to support one or more pages.

FIG. 1 is a conceptual diagram of a runtime pod that may interact with a source instance of data to support one or more pages. The example of FIG. 1 includes only a single runtime pod; however, any number of runtime pods may supported utilizing the techniques described herein.

As discussed above, source instance 110 refers to a metadata definition repository and is a primary source of dynamic data for serving pages. Source instance 110 may be data stored by one or more databases that are interconnected and/or are communicatively coupled with runtime pod 120. In one embodiment, page metadata is created and maintained on source instance 110. The page metadata that is used to serve pages is published to runtime pod 120 after creation. When source instance 110 is updated, the updated metadata and/or other data may be published to runtime pod 120.

Runtime pod 120 operates to provide metadata driven dynamic content to devices that request data (not illustrated in FIG. 1). In one embodiment, modifications (e.g., Create, Read, Update, Delete operations, or CRUD) may be accomplished using API calls to source instance 110. In one embodiment, the API is versioned so that the source instance and runtime pod(s) may be on different versions.

Figure 2:
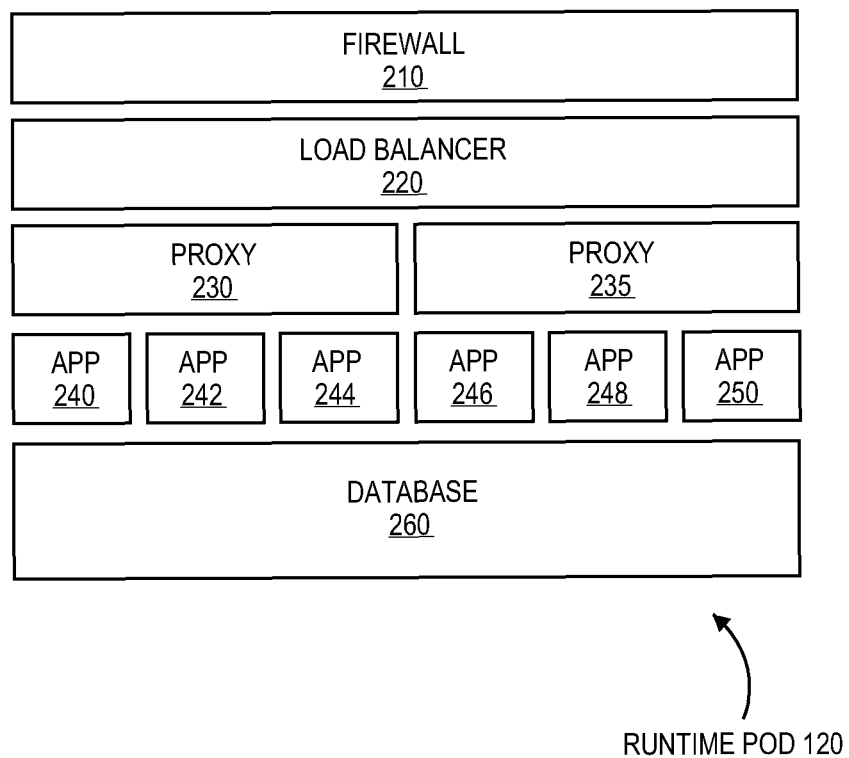
FIG. 2 is a block diagram of one embodiment of a runtime pod.

FIG. 2 is a block diagram of one embodiment of a runtime pod. The example of FIG. 2 provides specific numbers of various components; however, in alternate embodiments, different numbers and/or combinations of these components may be utilized.

In one embodiment, runtime pod 120 includes firewall 210, which operates to permit or deny network transmissions based upon a set of rules to protect runtime pod 120 from unauthorized access while permitting legitimate communications to pass. In one embodiment, runtime pod 120 further includes load balancer 220, which operates to distribute requests across components of runtime pod 120.

In one embodiment, runtime pod 120 includes one or more proxy servers (e.g., 230, 235), which operate to a proxy server is a server (a computer system or an application) that act as an intermediary for requests from clients (not illustrated in FIG. 2) seeking resources from application servers (e.g., 240, 242, 244, 246, 248, 250). A request from a client is received by the proxy server (e.g., 230, 235), that requests some service, such as a file, connection, web page, or other resource, available from an application server. The proxy server evaluates the request according to its filtering rules.

In one embodiment, runtime pod 120 includes multiple application servers (e.g., 240, 242, 244, 246, 248, 250), which may be hardware servers and/or software servers that provide services to respond to requests received from client devices. The application servers utilize database 260 to provide content in response to requests from client devices.

Runtime pod 120 receives content from a source instance as described above with respect to FIG. 1. The metadata and/or other information may be stored and/or utilized by the components of runtime pod 120 to respond to requests from client devices even when the source instance is unavailable to the client devices. In one embodiment, runtime pod 120 operates as a single server/device to respond to requests. As discussed above, runtime pod 120 may provide a different version of data as compared to the source instance under certain conditions, but may function to provide 100% uptime availability.

Figure 3:
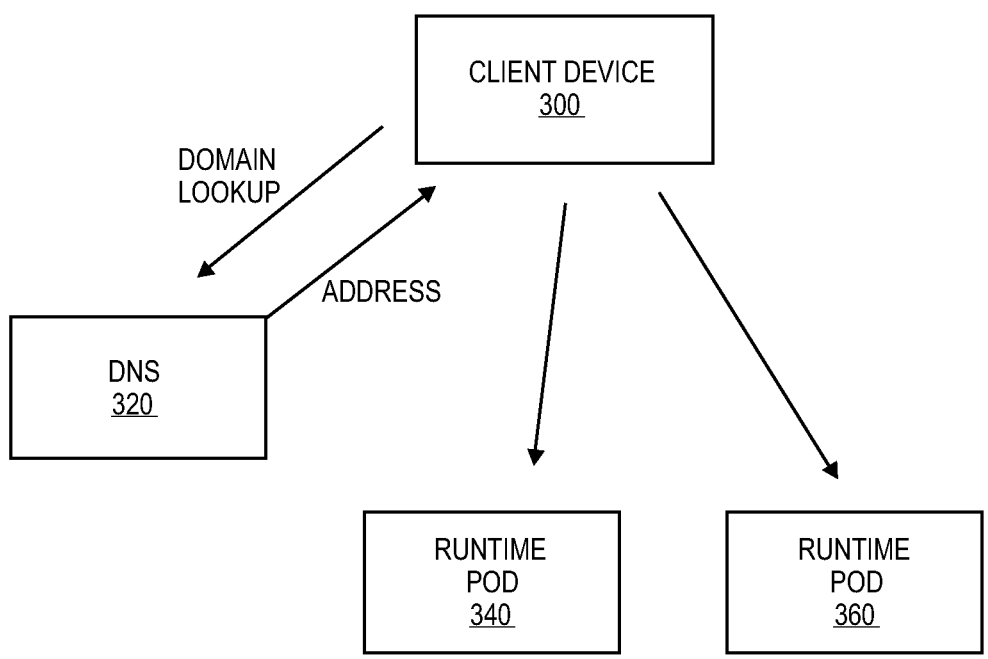
FIG. 3 is a block diagram of one embodiment of a network architecture having two runtime pods.

FIG. 3 is a block diagram of one embodiment of a network architecture having two runtime pods. In alternate embodiments, more than two runtime pods may be supported in a similar manner.

In one embodiment, at least two runtime pods (e.g., 340, 360) are each maintained in an active state (e.g., an ACTIVE-ACTIVE configuration). That is, each of at least two runtime pods is capable of serving pages at any time. In one embodiment, the runtime pods are set up in a Global Server Load Balancing (GSLB) configuration.

Client device 300 may perform a domain lookup with Domain Name System (DNS) 320, which may return an address (e.g., IP address) of one of the active runtime pods (e.g., 340, 360). Client device 300 may then use the address to send a request to one of the runtime pods, which may function as described above.

Figure 4:
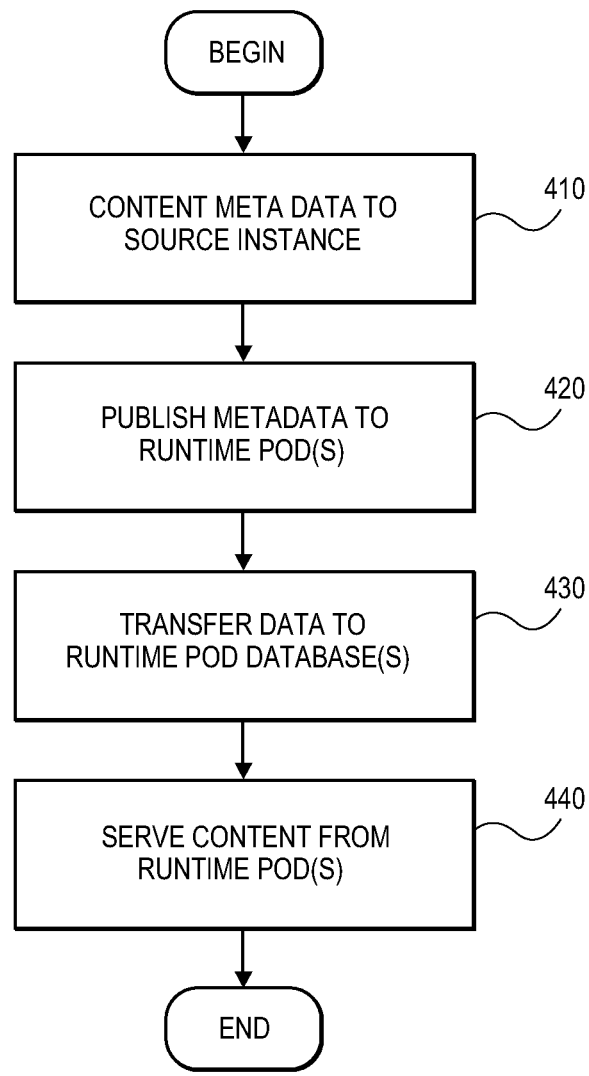
FIG. 4 is a flow diagram of one embodiment of a technique for utilizing runtime pods for providing dynamic page content.

FIG. 4 is a flow diagram of one embodiment of a technique for utilizing runtime pods for providing dynamic page content. The technique described with respect to FIG. 4 may be utilized with the architectures described herein.

Metadata and/or other data may be developed for a site and stored in the source instance, 410. The metadata and/or other data is utilized to dynamically construct pages of content in response to requests received from client devices.

The metadata is published to one or more runtime pods, 420. As described above, the runtime pods are groups of multiple servers that act as a single entity to dynamically generate metadata-driven content in response to requests received from client devices. When the runtime pods received the published metadata, the data is transformed and stored in the runtime pod database(s), 430. This allows the runtime pod(s) to have the necessary metadata to respond to requests from client devices.

When the databases have been updated, the runtime pod(s) may respond to requests utilizing the metadata, 440. If the runtime pod has a previous version of the metadata, the previous version may be utilized until the newly-published metadata can be processed and ready for use by the runtime pod(s).

In one embodiment, a single runtime pod is capable of serving many individual sites from many different customers. The load from any site may be spread across the runtime pod. This may result in a more full utilization of hardware resources as well as simplification of management and deployment.

In one embodiment, a site definition is stored as metadata in a runtime pod database. For example, each site's metadata may be stored according to the site's identifier (e.g., primary key). The primary key of the site can be retrieved by looking it up in a domain mapping table by the domain of a request. The metadata may be retrieved and converted to a specific format indicated by the request. The result can be sent back to the requesting device as a response (e.g., HTTP response). In one embodiment, the metadata and/or response may be cached for subsequent requests.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Figure 5:
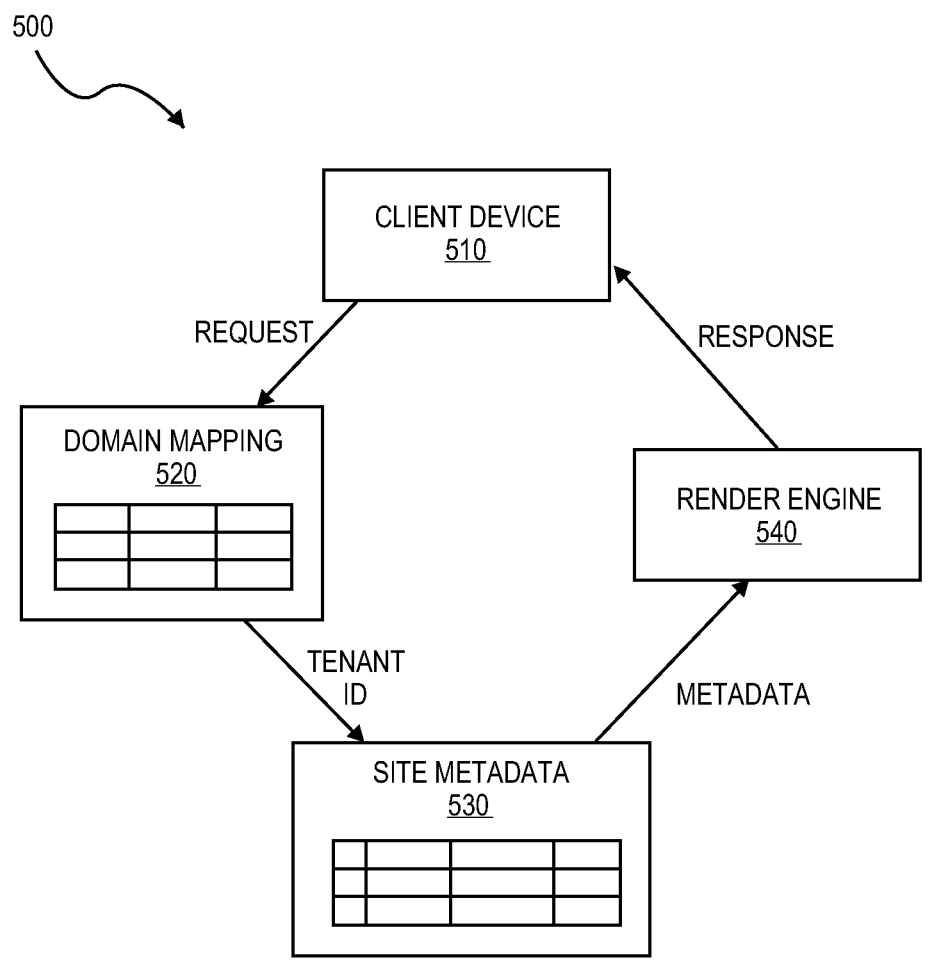
FIG. 5 is a block diagram of one embodiment of a runtime pod that may operate in a multitenant environment.

FIG. 5 is a block diagram of one embodiment of a runtime pod that may operate in a multitenant environment. The example of FIG. 5 illustrates a request received from a client device and processed by a runtime pod that is part of a multitenant environment. Any number of runtime pods may be supported within a multitenant environment.

A request is received from a client device 510 for a specific site (e.g., example.com). In one embodiment, runtime pod 500 includes domain mapping server 520 that operates to map the site from which the request comes (e.g., example.com) to a tenant identifier that may be used within the multitenant environment.

The tenant ID is then used to retrieve site metadata from site metadata server 530. The site metadata may then be used by render engine 540 to generate a response to be sent back to client device 510. In one embodiment, the response is provided in the form of an http response; however, other response formats may also be supported.

Figure 6:
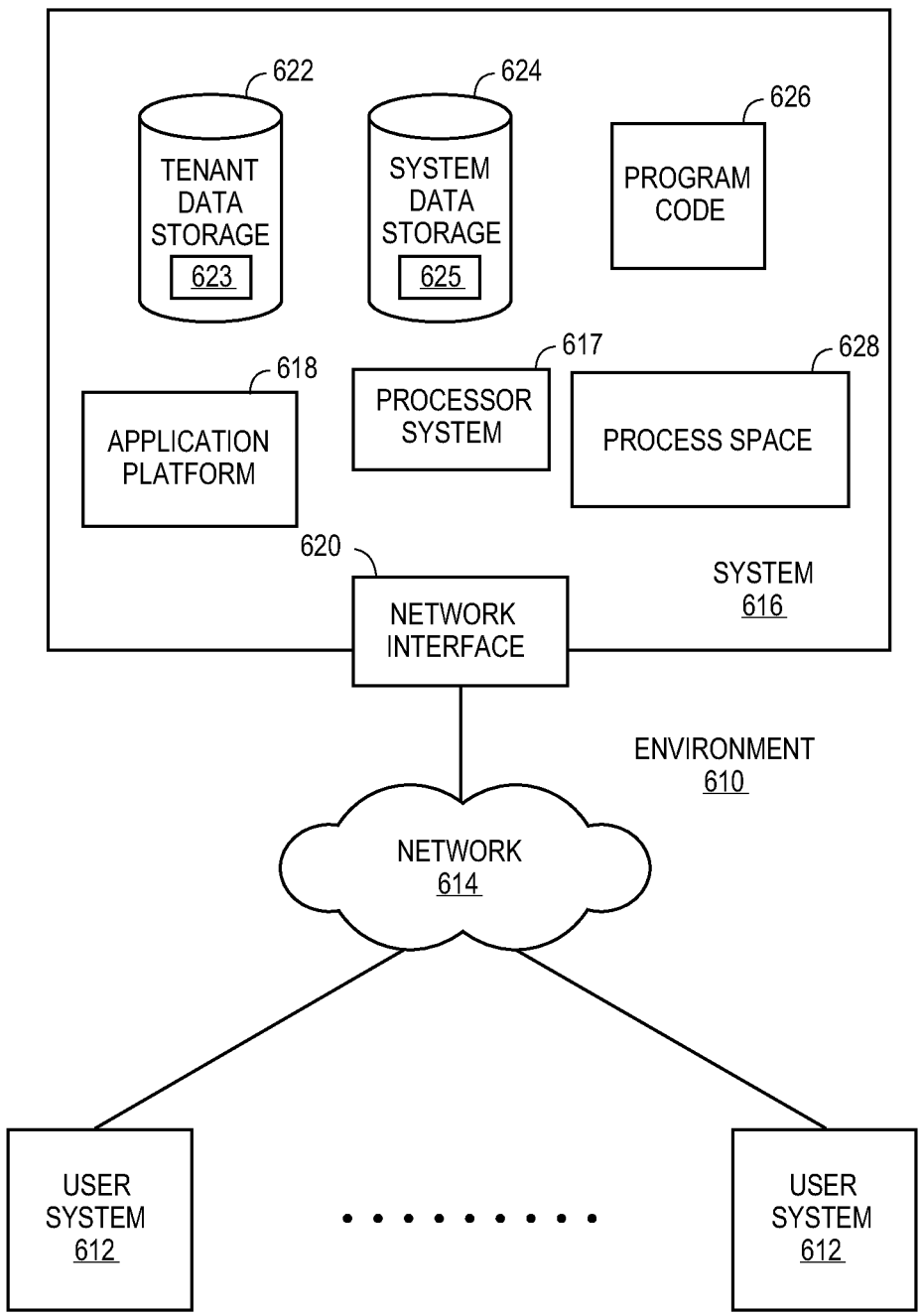
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 6) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein.

A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator.

In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614.

Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
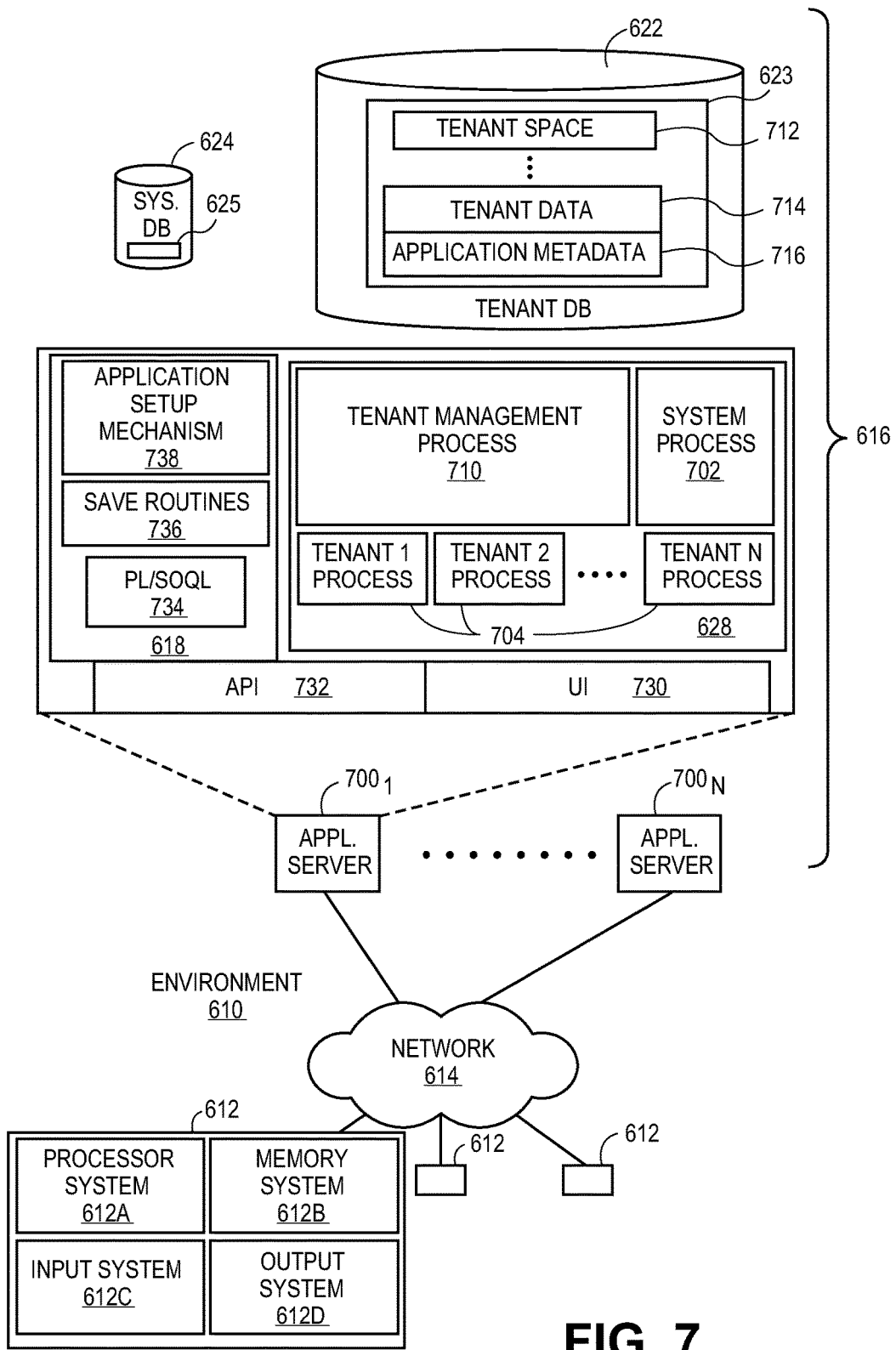
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700₁-700ₙ, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks.

As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data.

Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732.

A detailed description of some PL/SOQL language embodiments is discussed in commonly owned co-pending U.S. Provisional Patent Application 40/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700.

In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   storing metadata content as a source instance, the metadata content to be utilized to provide dynamically-constructed pages of content, wherein the metadata comprises at least a site definition stored according to a site identifier to allow the metadata to be retrieved and converted to a format indicated by a request;
   publishing the metadata content to one or more runtime pods communicatively coupled to receive the metadata content, wherein the source instance comprises a metadata definition repository and is a primary source of dynamic data for serving pages in the runtime pods, wherein the runtime pods comprise at least a domain mapping server to map the site identifier to a tenant identifier, a metadata server coupled with the domain mapping server, the metadata server to store the metadata content, and a render engine to dynamically generate metadata-driven content in response to requests received from client devices;
   receiving a request for content with a selected one of the one or more runtime pods for a specific site;
   mapping the specific site to a user, wherein the user is identified by a user identifier, wherein the user identifier is one of one or more user identifiers associated with the tenant identifier;
   using the user identifier to retrieve site metadata from the site metadata server;
   providing content, with the render engine, in response to the request with the selected runtime pod utilizing the metadata content.

2. The method of claim 1 wherein the one or more runtime pods operate within a multitenant database environment, wherein the multitenant database environment stores data for multiple client entities each identified by a tenant identifier (ID) having one of one or more users associated with the tenant ID, each having one or more users with corresponding user identifiers, wherein users of each of multiple client entities can only access data identified by a tenant ID associated with the respective client entity, and wherein the multitenant database is a hosted database provided by an entity separate from the client entities, and provides on-demand database service to the client entities.

3. The method of claim 2 wherein the multitenant environment comprises at least two runtime pods.

4. The method of claim 2 further comprising:
   mapping a source of the request to a tenant ID corresponding to the source based on the user identifier;
   retrieving metadata corresponding to the tenant ID;
   generating the response with a render engine based on the metadata.

5. The method of claim 1 wherein the runtime pod comprises at least one proxy server, at least one application server and at least one database server.

6. The method of claim 5 wherein the runtime pod further comprises at least one firewall and at least one load balancer.

7. An article comprising a non-transitory computer-readable medium having instructions stored thereon that, when executed by one or more processors, are configurable to cause the one or more processors to:
   store metadata content as a source instance, the metadata content to be utilized to provide dynamically-constructed pages of content, wherein the metadata comprises at least a site definition stored according to a site identifier to allow the metadata to be retrieved and converted to a format indicated by a request;
   publish the metadata content to one or more runtime pods communicatively coupled to receive the metadata content, wherein the source instance comprises a metadata definition repository and is a primary source of dynamic data for serving pages in the runtime pods, wherein the runtime pods comprise at least a domain mapping server to map the site identifier to a tenant identifier, a metadata server coupled with the domain mapping server, the metadata server to store the metadata content, and a render engine to dynamically generate metadata-driven content in response to requests received from client devices;
   receive a request for content with a selected one of the one or more runtime pods for a specific site;
   map the specific site to a user, wherein the user is identified by a user identifier, wherein the user identifier is one of one or more user identifiers associated with the tenant identifier;
   use the user identifier to retrieve site metadata from the site metadata server;
   provide content, with the render engine, in response to the request with the selected runtime pod utilizing the metadata content.

8. The article of claim 7 wherein the one or more runtime pods operate within a multitenant database environment, wherein the multitenant database environment stores data for multiple client entities each identified by a tenant identifier (ID) having one of one or more users associated with the tenant ID, each having one or more users with corresponding user identifiers, wherein users of each of multiple client entities can only access data identified by a tenant ID associated with the respective client entity, and wherein the multitenant database is a hosted database provided by an entity separate from the client entities, and provides on-demand database service to the client entities.

9. The article of claim 8 wherein the multitenant environment comprises at least two runtime pods.

10. The article of claim 8 further comprising instructions that, when executed, cause the one or more processors to:
   map a source of the request to a tenant ID corresponding to the source based on the user identifier;
   retrieve metadata corresponding to the tenant ID;
   generate the response with a render engine based on the metadata.

11. The article of claim 7 wherein the runtime pod comprises at least one proxy server, at least one application server and at least one database server.

12. The article of claim 11 wherein the runtime pod further comprises at least one firewall and at least one load balancer.

13. A system comprising:
   a metadata repository having at least one hardware processor and at least one memory device coupled to the at least one hardware processor, the metadata repository to store metadata content to be utilized to provide dynamically-constructed pages of content, wherein the metadata comprises at least a site definition stored according to a site identifier to allow the metadata to be retrieved and converted to a format indicated by a request;
   a domain mapping server to map the specific site to a user, wherein the user is identified by a user identifier, wherein the user identifier is one of one or more user identifiers associated with the tenant identifier;
   a metadata server coupled with the domain mapping server, the metadata server to store the metadata content; and
   a render engine to generate a response to the request.

14. The system of claim 13 wherein the one or more runtime pods operate within a multitenant database environment, wherein the multitenant database environment stores data for multiple client entities each identified by a tenant identifier (ID) having one of one or more users associated with the tenant ID, each having one or more users with corresponding user identifiers, wherein users of each of multiple client entities can only access data identified by a tenant ID associated with the respective client entity, and wherein the multitenant database is a hosted database provided by an entity separate from the client entities, and provides on-demand database service to the client entities.

15. The system of claim 14 wherein the multitenant environment comprises at least two runtime pods.

16. The system of claim 14 further comprising instructions that, when executed, cause the one or more processors to:
   map a source of the request to a tenant ID corresponding to the source based on the user identifier;
   retrieve metadata corresponding to the tenant ID;
   generate the response with a render engine based on the metadata.

17. The system of claim 13 wherein the runtime pod comprises at least one proxy server, at least one application server and at least one database server.

18. The system of claim 17 wherein the runtime pod further comprises at least one firewall and at least one load balancer.

* * * * *